United States Patent
Pollitt et al.

(10) Patent No.: US 12,085,125 B2
(45) Date of Patent: Sep. 10, 2024

(54) COMPOSITE SHAFT

(71) Applicant: Crompton Technology Group Limited, Oxfordshire (GB)

(72) Inventors: Will Pollitt, Kenilworth (GB); Andrew Wragg, Warwick (GB)

(73) Assignee: CROMPTON TECHNOLOGY GROUP LIMITED, Oxfordshire (GB)

( * ) Notice: Subject to any disclaimer, the term of this patent is extended or adjusted under 35 U.S.C. 154(b) by 436 days.

(21) Appl. No.: 17/470,281

(22) Filed: Sep. 9, 2021

(65) Prior Publication Data
US 2021/0404511 A1 Dec. 30, 2021

Related U.S. Application Data

(62) Division of application No. 15/941,035, filed on Mar. 30, 2018, now Pat. No. 11,137,018.

(30) Foreign Application Priority Data

Mar. 31, 2017 (EP) ..................................... 17164414

(51) Int. Cl.
*B29C 70/32* (2006.01)
*F16C 3/02* (2006.01)

(52) U.S. Cl.
CPC .............. *F16C 3/026* (2013.01); *B29C 70/32* (2013.01); *Y10T 403/32918* (2015.01)

(58) Field of Classification Search
CPC .. F16C 3/026; D01D 5/00; D01D 5/40; B29C 63/08
See application file for complete search history.

(56) References Cited

U.S. PATENT DOCUMENTS

| | | | |
|---|---|---|---|
| 4,681,556 A | * | 7/1987 | Palmer ................... B60K 17/22 464/181 |
| 4,704,918 A | | 11/1987 | Orkin et al. |
| 5,397,272 A | | 3/1995 | Smiley et al. |
| 5,605,507 A | | 2/1997 | Huvey et al. |

(Continued)

OTHER PUBLICATIONS

Extended European Search Report for International Application No. 17164414.9 dated Oct. 10, 2017, 7 pages.

(Continued)

*Primary Examiner* — Alison L Hindenlang
*Assistant Examiner* — Debjani Roy
(74) *Attorney, Agent, or Firm* — CANTOR COLBURN LLP

(57) ABSTRACT

A filament wound composite fibre reinforced polymer shaft comprising helical wound fibres, the shaft having at least one hole perpendicular to an axis of the shaft; wherein fibre paths of the helical wound fibres divert around the hole. The hole can be used as an attachment point to connect the shaft to other parts, e.g. by means of a pin passed directly through the hole. The amount of metal used in this type of connection can be significantly reduced compared to using metal end fittings, thus greatly reducing cost and weight of the whole system. Fibres are diverted around the hole rather than the hole being cut through the fibres which would reduce the strength of the shaft as a whole. By diverting the fibres around the hole, the fibres retain their load bearing properties and the strength of the shaft is maintained even in the presence of the hole.

12 Claims, 3 Drawing Sheets

(56) References Cited

U.S. PATENT DOCUMENTS

| | | | |
|---|---|---|---|
| 8,302,633 B2* | 11/2012 | Saltel | F16L 11/081 |
| | | | 285/368 |
| 8,672,574 B2 | 3/2014 | Cavallere et al. | |
| 9,555,586 B2 | 1/2017 | Richard et al. | |
| 2012/0305173 A1 | 12/2012 | Masson et al. | |
| 2014/0079482 A1* | 3/2014 | Sohl | F16C 3/023 |
| | | | 403/376 |
| 2018/0283441 A1 | 10/2018 | Pollitt et al. | |

OTHER PUBLICATIONS

CA Office Action for Application No. 2,994,314, mailed Oct. 12, 2023, 5 pages.

BR Brazilian Office Action for BR Application No. BR102018005363-9, dated May 13, 2022, pp. 1-4.

Translation of BR Brazilian Office Action for BR Application No. BR102018005363-9, dated May 13, 2022, 2 pages.

* cited by examiner

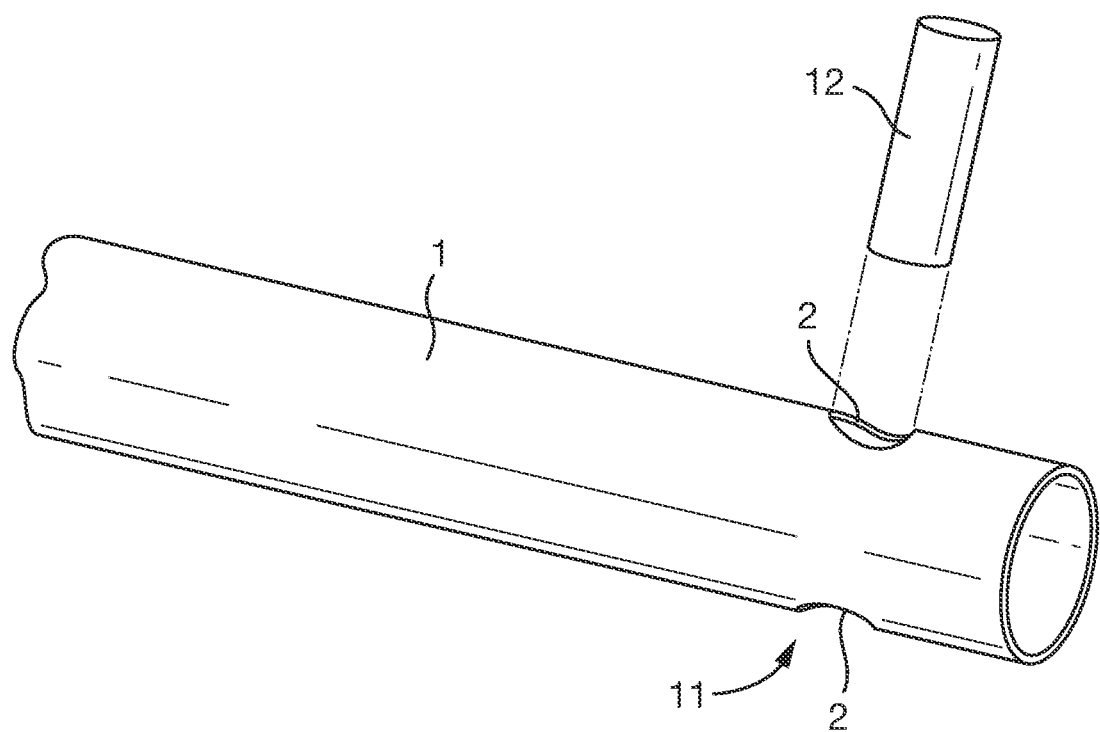

COMPOSITE SHAFT

CROSS REFERENCE TO RELATED APPLICATIONS

This application is a division of U.S. application Ser. No. 15/941,035, filed Mar. 30, 2018 which claims priority to European Patent Application No. 17164414.9 filed Mar. 31, 2017, the entire contents of which are incorporated herein by reference.

TECHNICAL FIELD

This disclosure relates to composite shafts and joining composite shafts to other parts, e.g. by a clevis. The disclosure has particular applicability to tie rods and transmission shafts for aerospace applications, although it can also readily be applied to many other uses.

BACKGROUND

Composite shafts are typically formed from Polymer Matrix Composites (PMCs) which comprise some form of fibre or polymer encased within a matrix such as resin. One example is Carbon Fibre Reinforced Polymer (CFRP). Filament wound structures are typically formed by winding filaments such as carbon fibres around a mandrel in a helical fashion so as to build up a tube shaped shaft. The angle of the helical winding influences the properties of the shaft. For example, windings approaching 45 degrees have higher torsional properties and those higher than 45 degrees have greater properties in the hoop direction. About 45 degrees is generally optimal for torque transmission. Other techniques for manufacturing PMCs include braiding, fibre placement techniques (including AFP), prepreg wrap techniques and pultrusion methods. Composite shafts may involve several layers, with different layers having different properties. For example, the fibre angle may be varied between layers to give different properties such as for bending resistance or impact resistance.

Interfacing with PMC rods can be challenging due to the reduced strength by volume. Standard fixings designed to interface with metal are not usually suitable and therefore the normal solution is to interface with the PMC rod via a metal part that is fitted onto the rod. However metal parts add weight and cost to the overall part. This detracts from the weight and cost savings which are among the greatest advantages of using PMCs in the first place.

It is desirable that the connection between the shaft and other components be structurally efficient so as to minimise weight while ensuring good force transmission and good joint robustness.

SUMMARY

According to this disclosure, there is provided a filament wound composite fibre reinforced polymer shaft comprising helical wound fibres, the shaft having at least one hole perpendicular to an axis of the shaft; wherein fibre paths of the helical wound fibres divert around the hole.

Viewed from an alternative aspect, this disclosure provides a filament wound composite fibre reinforced polymer shaft having at least one hole formed perpendicular to the axis of the shaft formed by diverting the helical fibre paths around the hole.

The hole in the filament wound shaft can be used as an attachment point to connect the shaft to other parts, e.g. by means of a pin passed directly through the hole. The amount of metal used in this type of connection can be significantly reduced compared to the metal end fittings used previously, thus greatly reducing cost and weight of the whole system.

The fibres are diverted around the hole rather than the hole simply being cut through the fibres. Cutting the fibres would significantly reduce the strength of the shaft as a whole as the cut would affect a large number of fibres in multiple layers, reducing the tensile strength that is provided by the fibres. By diverting the fibres around the hole, the fibres retain their load bearing properties and the strength of the shaft is maintained even in the presence of the hole (it will be appreciated that there may be some weakening of the structure in the vicinity of the hole, but not so much as to make the part unusable).

The filament winding process lays the fibres such that they would be substantially parallel in the vicinity of the hole, but for the diversion around the hole. Thus, after the diversion, the fibres continue in the direction they would have taken if the hole were not present. The shaft may be terminated at a point axially removed from the hole, e.g. by cutting through the shaft, but the fibres still all run continuously from one end of the shaft to the other and thus transmit the required forces.

Filament winding is better for this technique than for example braiding as individual fibre placement is possible around the hole or other feature to make a non-axisymmetric part, this would not be possible with braiding as all of the fibres are manipulated together.

The main body of the composite shaft is formed by winding fibres helically around a mandrel thus forming a hollow shaft once the mandrel is removed. A single fibre may be wound around the mandrel as it is displaced axially back and forth parallel to the mandrel axis such that one fibre traverses the length of the mandrel multiple times. However, typically the resulting shaft will be cut at one or both ends after forming, such that each lengthwise traverse ends up being a single fibre. Regardless of whether or not such cutting is performed, each traverse of the shaft axis can effectively be considered as a single fibre and that is how they are treated in the remainder of this disclosure. Thus each of these fibres forms a helix around the shaft axis (and thus also around the mandrel axis). Many of these fibres will be unaffected by the hole as their helical path does not intersect the hole. These fibres will simply follow the same path that they would have followed if the hole were not being formed. However, fibres which would have intersected the hole will be displaced to one or other side of the hole, such that the path of these fibres deviates from the path that they would have taken if the hole were not being formed. Preferably the fibre path of each fibre diverted around the hole forms an arc around the hole of no more than 200 degrees, preferably an arc of no more than 180 degrees. It will be appreciated that each fibre must pass either to one side of the hole or to the other side of the hole. Ideally, each fibre will be diverted to the side of the hole that requires the least divergence of its path and will thus contact the hole along an arc of no more than 180 degrees. Indeed most fibres that are incident upon the hole at a lateral offset from the hole centre will contact the hole along a much smaller arc. However, it will be appreciated that some process variation such as vibration or manufacturing irregularities in the forming machinery may result in a small number of fibres being displaced to the less efficient side of the hole and thus a small number of these fibres may contact the hole along an arc greater than 180 degrees. However, these should be kept to a minimum and are preferably entirely excluded.

It will be appreciated that the fibres of the shaft may have a non-axisymmetric pattern due to the divergence of the fibres around the hole.

Although a single hole may be used to form a useful join with another component in some implementations, in the majority of connections a symmetrical joint is preferred and thus the shaft preferably comprises at least two holes each perpendicular to the axis of the shaft and wherein around each hole fibre paths of the helical wound fibres divert. In other words, the shaft preferably comprises at least two holes each formed perpendicular to the axis of the shaft and each formed by diverting the helical fibre paths around the respective hole. The arc length considerations described above preferably apply to both (or further) holes as they are preferably formed by the same process. This disclosure is not limited to two holes and may incorporate any number of holes formed in this way, e.g. three or four holes may be formed for particular joints. Additionally it may be desirable to form two connections on the shaft, one at each end. Each connection may have two or more holes, thus requiring four or more holes to be formed in the shaft.

The two holes of a joint may be non-coaxial and will be formed according to the type of joint that is required for a specific part and/or a specific connection type. However, in some particularly preferred examples the two holes are coaxial. Coaxial holes allow for a single rod or pin to be passed through both holes at once, thus making use of the structural strength of both sides of the shaft at once. In preferred examples the two holes form a clevis. A clevis is a yoke or fork shape (typically U-shape) with holes in each end through which a pin or bolt may be run so that the clevis can be used as a fastening device. Thus the two holes formed in a hollow composite shaft provide the holes through which a pin or bolt may be inserted so that the end of the hollow shaft can be used directly as a fastening device.

The filament winding process lays fibres around a mandrel in a helical pattern, typically with a carriage (fibre holder) passing axially back and forth along the axis of a mandrel while the mandrel rotates. The carriage and the mandrel are controlled in accordance with a program specific to the part being manufactured. In order to retain the maximum tensile strength of the fibres, the fibres are preferably laid past the hole in the axial direction before the axial direction is changed by reversing the direction of the carriage. The distance that the fibres are laid past the hole will depend on several factors such as the diameter of the shaft, the diameter of the hole, the type of fibres and resin, etc. However, to ensure that the fibres pass the hole without changing axial direction and have sufficient distance to regroup after the diversion around the hole, it is preferred that the fibres pass the hole without changing axial direction for a distance of at least one hole diameter. In this way the hole is axially spaced from an end region in which the fibres change axial direction as part of the normal filament winding process.

In some examples, some fibres may be turned around the hole, i.e. they may change axial direction by turning around the hole. Other fibres that do not intersect the hole may turn around in the conventional manner, e.g. at an axial position distanced from the hole.

According to a further aspect of this disclosure, there is provided a method of forming a composite fibre reinforced polymer shaft having at least one hole formed perpendicular to the axis of the shaft, comprising: providing a mandrel having a projection at the location where the hole is to be formed; and using a filament winding process to lay fibres in a helical fashion around the mandrel such that they are displaced around the projection in the location where the hole is to be formed.

This method of forming a shaft with a hole uses a physical structure as an obstruction to push the fibres out of the way during the winding process. As the projection takes up the space that will eventually form the hole in the finished product, the fibres are natural diverted out of the way by being forced to divert around the projection. However the natural position of the fibre is retained as far as possible by the control of the winding process, i.e. control of the mandrel and the carriage. These can operate substantially as they would have done in the absence of any holes, thus essentially ignoring the hole forming process. After fibres have been diverted by the projection(s), the fibres will naturally be drawn back onto their original paths.

In some examples, additional strengthening fibres may be added to the shaft in the vicinity of the hole. For example, where the fibres have been diverted around the hole, there may be small gaps or weaknesses in the shaft structure. Additional windings may be used to overlay these gaps or to add strength to the other windings. Some examples of such additional windings are as follows:

1) hoop wound reinforcement fibre wound adjacent to the hole on either one or both axial sides of the hole.

2) circumferential hole reinforcement fibre wound around the circumference of the hole.

3) in the case of two or more holes at one axial end of the shaft, reinforcement lashing wrapped around two holes (preferably adjacent holes). Such lashing may be cross-lashed such that it is wrapped in a figure of eight pattern around the two holes.

It will be appreciated that as part of the process of forming a finished product, a matrix material such as resin must be provided around the fibres. This may be achieved in any of the usual manners such as by towing the fibres through a resin bath during the fibre placement or by soaking the wound fibres and mandrel in a resin bath after the winding process. In some examples the fibres are prepreg fibres, i.e. fibres provided with resin already coated thereon. The prepreg fibres are typically slightly stickier than fibres drawn through a resin bath and thus will tend to stick to each other more during the fibre winding. Thus when a fibre contacts the projection and is diverted away from its normal path, the parts of the fibre that have already been placed in contact with the underlying fibres or mandrel will be displaced less, thus encouraging the diverging path to be closer to an arc around the hole/projection. In other preferred examples the fibres are wet wound, e.g. towed through a resin bath during placement. Wet fibres are more easily diverted around an obstruction due to not being as sticky.

The projection preferably has a taper that narrows away from the mandrel. In some preferred examples it tapers to a point. The projection may have a cylindrical base adjacent to the mandrel with a tapered part provided above it. The tapering helps to ensure that fibres are divided into two groups falling either side of the projection without the risk of any fibres getting caught on top of the projection. The projection may be parallel-sided immediately adjacent to the mandrel or it may have a taper towards the mandrel to facilitate or enable removal of the projection from the mandrel after curing.

As discussed above, two or more holes may be desirable in certain implementations, e.g. two opposite holes to form a clevis. Thus preferably at least two projections are provided on the mandrel, preferably diametrically opposite one another.

It will be appreciated that after forming the product, the mandrel is preferably removed from the shaft. Thus the method preferably further comprises: removing the projection(s); and removing the mandrel. It will be appreciated that this takes place after application of the resin and curing of the resin. The mandrel and projections may all be removed in a single process, e.g. in the case of a dissolvable mandrel or other deformable mandrel. However, if the mandrel is rigid and non-dissolvable then the projections are preferably removed first, followed by removing the rest of the mandrel along the main axis of the shaft.

Where two diametrically opposite projections are used, these may be provided as separate projection each attached to the mandrel or they may be formed as a single pin that passes through a hole formed in the mandrel, thus ensuring accurate alignment of the holes in the end product.

As discussed above, preferably the filament winding process changes the axial direction of the fibres at an axial position spaced apart from the projection(s). This ensures that the fibres run past the holes and can provide tension around the holes and along the full length of the shaft.

As fibres are diverted around the hole, it will be appreciated that there will be a build up in the radial direction of fibres around the circumference of the hole as the diverted fibres are laid on top of other diverted fibres and on fibres that are undiverted. This build up may be removed after the product has been formed (i.e. after curing) so as to provide a consistent diameter along the shaft. Thus preferably the method further comprises a step of machining the shaft in the region of the hole to remove excess material. While this may result in the severing of a few fibres, it will not cut through so many that the structural strength of the product is affected. If this is of concern then it will be appreciated that this machining is not essential.

BRIEF DESCRIPTION OF DRAWINGS

One or more non-limiting examples will now be described, by way of example only, and with reference to the accompanying figures in which:

FIG. 6 shows a clevis formed in a hollow shaft comprising two holes.

DETAILED DESCRIPTION

Figure 1:
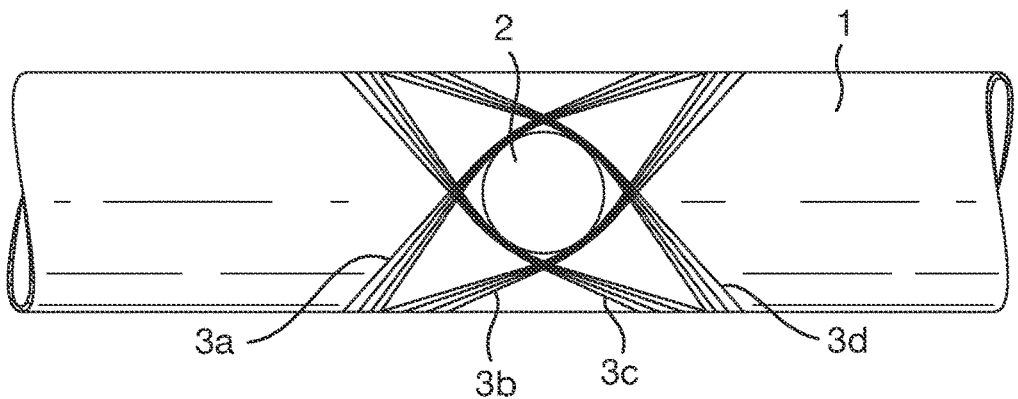
FIG. 1 shows a first example of fibre placement around a hole.

FIG. 1 shows a composite filament wound shaft 1. A hole 2 is formed in the shaft 1 perpendicular to the shaft axis. The paths of certain fibres 3 are shown in FIG. 1. It will be appreciated that only a reduced number of fibres 3 are shown for illustrative purposes and so that the paths can be distinguished. In reality many more fibres are used, spaced much closer together.

It can be seen in FIG. 1 that the fibres 3 have been diverted around the hole such that they follow a different path from the path that they would have taken if they had been laid down unhindered. In a filament winding process the fibre is supplied through the carriage which is passed axially back and forth along the length a mandrel while the mandrel is rotated. The fibre thus forms a helical path around the mandrel with the angle of the helix being determined by the traversing speed of the carriage relative to the rotation speed of the mandrel. Several layers may be deposited on top of each other and these layers may have different fibre angles. Adjacent fibres in any layer generally have the same angle such that they run substantially parallel paths around the shaft/mandrel. In this context, parallel paths means paths with the same helix angle, but with an axial displacement along the shaft axis. However, as can be seen in FIG. 1, in this example, the fibres 3 in the vicinity of the hole 2 have been displaced such that they no longer run in parallel paths in the vicinity of the hole 2, but are diverted from their normal paths so as to form the hole. Fibres 3a and 3b would, if no hole were being formed, have been deposited in substantially parallel helical paths. However, to form the hole 2, fibres 3a have been deflected to one side of the hole 2 and fibres 3b have been deflected to the opposite side of the hole 2. Similarly, fibres 3c and 3d would, if no hole were being formed, have been deposited in substantially parallel helical paths. However, to form the hole 2, fibres 3c have been deflected to one side of the hole 2 and fibres 3d have been deflected to the opposite side of the hole 2. Fibres 3a and 3b are typically deposited in one direction (e.g. left to right in the figure) while fibres 3c and 3d are deposited in the other direction (e.g. right to left in the figure) with the mandrel rotating in the same direction throughout. Thus the fibres 3a, 3b, 3c and 3d are diverted around four different tangential points of the hole. In FIG. 1, the hole 2 is illustrated by an ideal circle, although it will be appreciated that this ideal shape may not be achieved in practice simply with the windings shown in FIG. 1.

The fibre paths 3a-3d shown in FIG. 1 show paths that may be formed when the fibres have a reasonable degree of freedom to move as they are deposited such that is the fibres 3a-3d are deflected, the path is deflected across a relatively long distance. This may be the case with wet wound fibre winding techniques such as towing through a resin bath as the fibres are less sticky and thus do not immediately adhere to underlying layers during deposition.

The fibres 3a-3d are laid past the hole in the axial direction before the axial direction is changed by reversing the direction of the carriage. The distance that the fibres 3a-3d are laid past the hole will depend on several factors such as the diameter of the shaft 1, the diameter of the hole 2, the type of fibres and resin, etc. However, to ensure that the fibres 3a-3d pass the hole 2 without changing axial direction and have sufficient distance to regroup after the diversion around the hole 2, the fibres 3a-3d pass the hole 2 without changing axial direction for a distance of at least one hole diameter. In this way the hole 2 is axially spaced from an end region in which the fibres 3a-3d change axial direction as part of the normal filament winding process.

Figure 2:
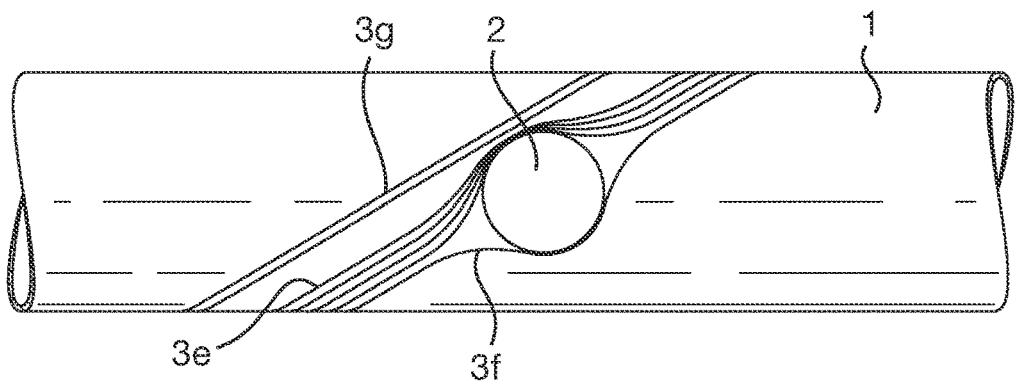
FIG. 2 shows a second example of fibre placement around a hole.

FIG. 2 shows some alternative deflected fibre paths 3e and 3f which may be more typical of winding with prepreg fibres as these are more sticky and will adhere to the underlying layer resulting in path deflection being closer to the hole 2 and contacting the hole 2 along a longer path. Fibres 3e pass to one side of the hole 2 while fibre 3f passes to the other side of hole 2 as they approach the hole from different sides of its centreline, each passing on the side of hole 2 that will result in the shortest path around the hole 2. Again, hole 2 is shown in an ideal circular form which will not be achieved in practice. FIG. 2 also shows some undeflected fibres 3g which do not pass adjacent to the hole 2 and thus are not deflected from their normal helical path.

Figure 3:
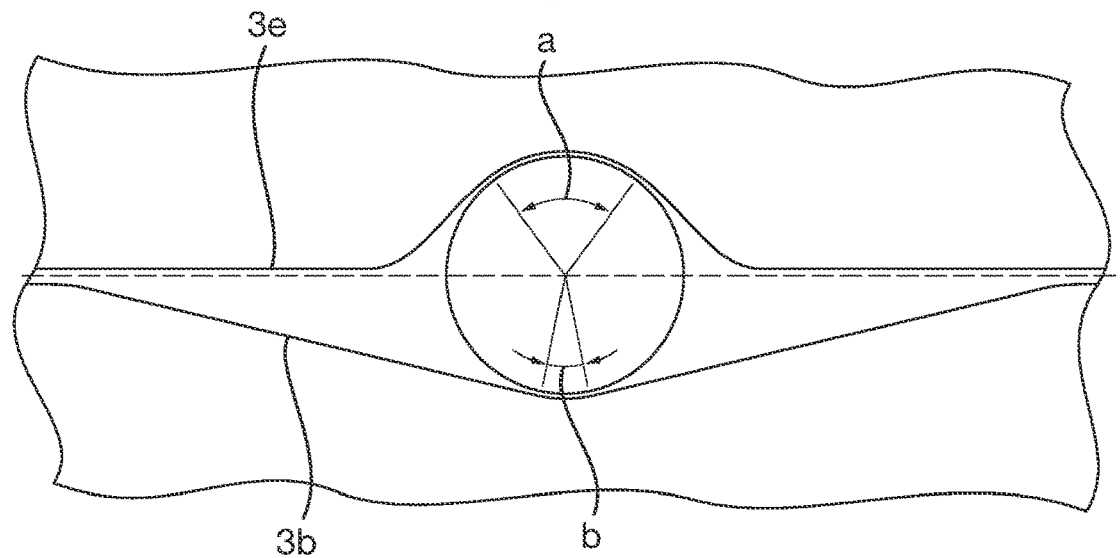
FIG. 3 illustrates the contact angle of fibres adjacent to a hole.

FIG. 3 illustrates the difference in path shape in more detail. As examples, the paths of fibres 3b and 3e passing around hole 2 are shown. Fibre 3e contacts the ideal circular hole shape 2 along a larger angle a than fibre 3b which contacts the ideal circular hole shape 2 along an angle b. Both angles a and b are significantly smaller than 180 degrees, i.e. the fibres are not wound all the way around the hole 2, but are merely deflected around it.

Figure 4:
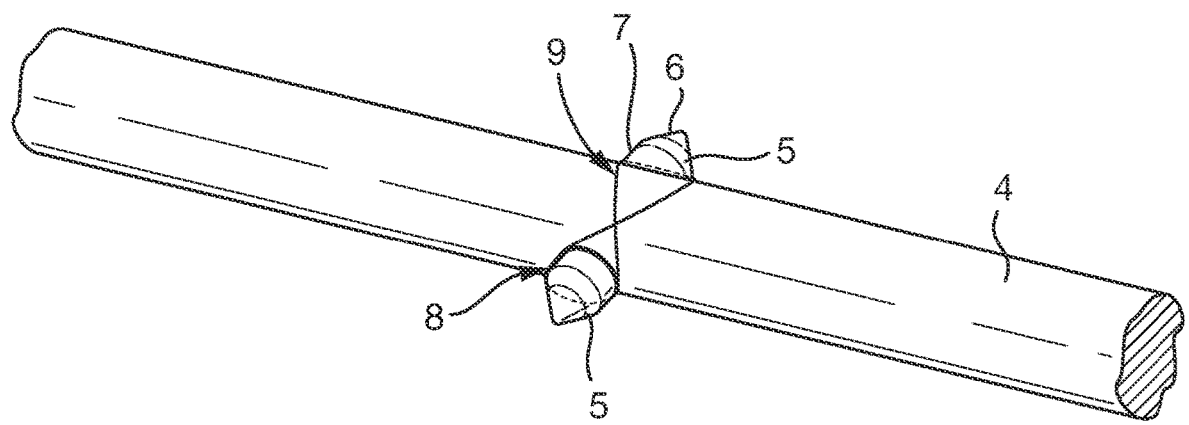
FIG. 4 illustrates two fibre reinforcement techniques.

FIG. 4 illustrates the mandrel 4 that is used for forming the shaft 1 with hole 2. The mandrel 4 has pins (or projections) 5 projecting from it substantially perpendicular to its axis. In this example two pins (or projections) 5 are shown, but a single pin (or projection) 5 could be used, or a greater number of pins or projections 5 could be used. The basic filament winding process can be used in the same manner as for normal shafts without holes. However the pins (or projections) 5 naturally deflect the fibres 3 as they are laid down on the mandrel 4. As shown in FIG. 4, each pin (or projection) 5 has a tapered section 6 that tapers away from the mandrel 4 and in this example tapers to a point that ensures fibres are deflected either to one side or the other of pin (or projection) 5 as they are laid down. The pins (or projections) 5 also taper very slightly towards the mandrel in the section 7 adjacent to the mandrel 4 as this helps with removal of the pins (or projections) 5 later in the process. The programme that controls the filament winding process will preferably position the fibres around the pin rather than just relying on them being deflected around it.

For clarity, FIG. 4 does not show the normal helical fibres 3 that are illustrated in FIGS. 1 and 2. However, FIG. 4 does illustrate two techniques for adding strengthening fibres around the hole 2. The first technique is simply to wind fibre 8 around the pin 5, thus depositing circular loops of fibre around the circumference of the hole 2, filling in or strengthening gaps that may have been formed in the main filament winding process and building up the profile of the shaft 1 in the region of the hole 2. The second technique illustrated in FIG. 4 is a cross-lash 9 which is wound around two pins 5, each of which forms a hole 2 in the shaft 1. In the example shown in FIG. 4, the two pins (or projections) 5 are coaxial and diametrically opposite one another on the shaft 1 such that together they will form a clevis at the end of the shaft 1. The cross-lash fibre 9 passes around one pin 5 in one sense (clockwise or anticlockwise) when viewed towards the mandrel, then passes around the other pin 5 in the opposite sense, also viewed towards the mandrel, before returning to pass around the first pin 5 in the same sense as before, thus forming a figure eight pattern that crosses over itself between the pins 5 and which can be repeated a number of times to lay down a suitable volume of fibre. It will be appreciated that a similar cross lash 9 may also be formed around the same two pins 5 on the opposite side of the mandrel for symmetry and balancing. It will also be appreciated that a non-crossed lash may also be performed by passing the fibre in the same sense around both pins and not crossing the fibre over itself between the pins 5.

Figure 5:
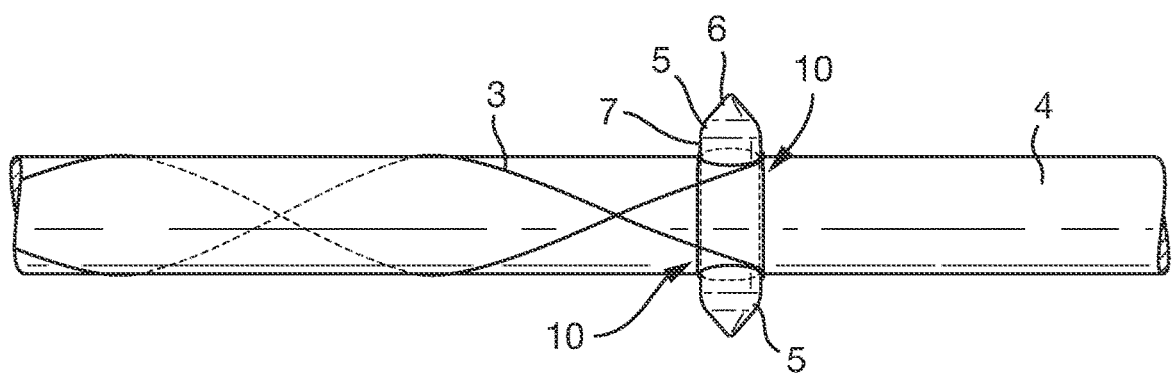
FIG. 5 illustrates an additional fibre reinforcement technique and use of a pin for fibre turnaround.

FIG. 5 shows a further fibre reinforcement technique for the hole 2 by winding hoop fibre 10 around the mandrel 4 on one or both axial sides of the pins (or projections) 5 and thus on one or both sides of the hole 2 (both sides are illustrated in FIG. 5).

FIG. 5 also shows how the pins 5 may be used to turn helical wound fibres around the pin 5 when the carriage changes direction. If the natural helical path of the fibre would bring it into contact with the pin 5, it can be turned neatly around the pin 5, thus changing direction of movement along the mandrel axis.

It will be appreciated that the techniques illustrated in FIG. 4 will require oscillating the mandrel 4 back and forth while moving the carriage back and forth. The techniques illustrated in FIG. 5 can be performed while the mandrel 4 continues to rotate in the same direction.

The techniques shown in FIGS. 4 and 5 may of course be used either alone or in combination so as to provide the optimal reinforcement for a particular application.

To form a hollow shaft with a hole according to the techniques described here, a mandrel 4 is provided with at least one pin 5 projecting radially outwardly at the position at which the hole 2 is desired. The filament winding process is then performed as for a normal shaft winding process, but with the fibres being deflected by the pin(s) 5 so that no fibre is laid in the region where the hole 2 is desired. Beneficially, the hole is formed without cutting through the fibres in the region of the hole 2, thus all fibres provide strength across the hole, improving the overall properties of the shaft 1. Additional fibre strengthening techniques may then be applied around the pin(s) 5 (i.e. in the region of the hole(s) 2) so as to add additional strength to the shaft in the vicinity of the holes 2. Resin is applied using known techniques, such as using resin baths and/or prepreg fibres and the shaft is cured, again using known techniques. The pins 5 and mandrel 4 are then removed, leaving a shaft 1 with one or more holes 2 formed therein. Where the pins 5 are fixedly mounted to the mandrel 4, they must normally be removed first before the mandrel 4 can be removed. However, it will be appreciated that other techniques such as dissolvable mandrels may also be used in which case the order of removal is not important.

FIG. 6 shows a clevis 11 formed in a hollow shaft 1 comprising two holes 2, each formed according to the techniques described above. A rod 12 is shown that can be passed through the two holes 2 of the clevis 11 (and also through any additional connecting structure inserted inside the shaft 1 between the holes 2 or provide outside of the shaft 1 around the holes 2), e.g. for connection of other devices or equipment.

The invention claimed is:

1. A method of forming a composite fibre reinforced polymer shaft having at least one hole formed perpendicular to the axis of the shaft, comprising:
   providing a mandrel having a projection at a location where the at least one hole is to be formed; and
   using a filament winding process to lay fibres in a helical fashion around the mandrel such that they are displaced around the projection in the location where the at least one hole is to be formed;
   wherein:
   the at least one hole includes two coaxial holes each perpendicular to an axis of the shaft and arranged to form a clevis;
   fibre paths of the helical wound fibres divert around each hole; and
   helical wound fibres pass the two coaxial holes without changing axial direction for a distance of at least one hole diameter.

2. A method as claimed in claim 1, wherein the projection comprises a taper that narrows towards the mandrel.

3. A method as claimed in claim 1, further comprising:
   removing the projection(s); and
   removing the mandrel.

4. A method as claimed in claim 1, wherein the filament winding process changes the axial direction of the fibres at an axial position spaced apart from the projection(s).

5. The method of claim 1, further comprising:
adding additional strengthening fibre to the shaft in the vicinity of the at least one hole.

6. The method of claim 5, wherein said additional strengthening fibre comprises hoop wound reinforcement fibre wound adjacent to the hole on one or both axial sides of the at least one hole.

7. A method of forming a composite fibre reinforced polymer shaft having at least one hole formed perpendicular to the axis of the shaft, comprising:
providing a mandrel having a projection at a location where the at least one hole is to be formed; and
using a filament winding process to lay fibres in a helical fashion around the mandrel such that they are displaced around the projection in the location where the at least one hole is to be formed;
wherein:
the at least one hole includes a first hole and a second hole;
said additional strengthening fibre comprises reinforcement lashing wrapped around two of said holes; and
wherein said lashing is cross-lashed such that it is wrapped in a figure eight pattern around said two holes.

8. A method as claimed in claim 7, wherein the projection comprises a taper that narrows towards the mandrel.

9. A method as claimed in claim 7, further comprising:
removing the projection(s); and
removing the mandrel.

10. A method as claimed in claim 7, wherein the filament winding process changes the axial direction of the fibres at an axial position spaced apart from the projection(s).

11. A method as claimed in claim 7, further comprising:
adding additional strengthening fibre to the shaft in the vicinity of the at least one hole.

12. The method of claim 11, wherein said additional strengthening fibre comprises hoop wound reinforcement fibre wound adjacent to the hole on one or both axial sides of the at least one hole.

* * * * *